Patented Jan. 26, 1926.

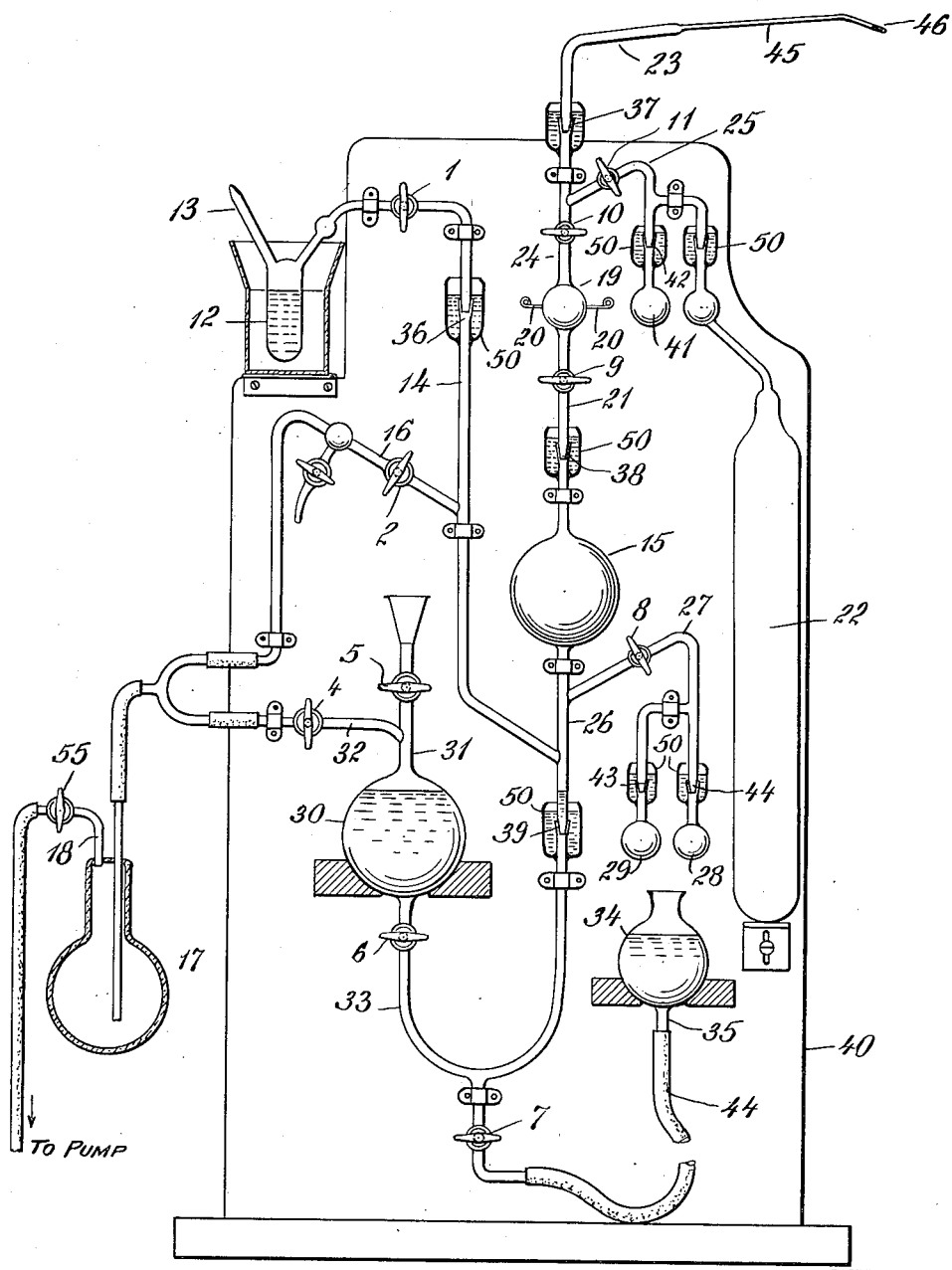

1,570,834

UNITED STATES PATENT OFFICE.

VICTOR F. HESS, OF ORANGE, AND EDWIN D. LEMAN, OF EAST ORANGE, NEW JERSEY, ASSIGNORS TO UNITED STATES RADIUM CORPORATION, A CORPORATION OF NEW YORK.

METHOD OF AND APPARATUS FOR PURIFICATION OF RADIUM EMANATION.

Application filed June 14, 1923. Serial No. 645,258.

*To all whom it may concern:*

Be it known that we, VICTOR F. HESS and EDWIN D. LEMAN, a citizen of Austria, and resident of Orange, Essex County, New Jersey, and a citizen of the United States, and resident of East Orange, Essex County, New Jersey, respectively, have invented certain new and useful Improvements in Methods of and Apparatus for Purification of Radium Emanation; and we do hereby declare the following to be a full, clear, and exact description of the invention, such as will enable others skilled in the art to which it appertains to make and use the same.

This invention relates to the production of concentrated radium emanation from radium containing materials and has among its principal objects the provision of methods and means of accomplishing this result which are less complicated and more efficient than those hitherto known.

As is well known radium emanation is a chemically inert gas (atomic weight, 222) formed by the radio active decay of radium. The radium emanation itself decays to one half of the original value of its radio active power in about 3.85 days. Therefore, in radium salts the maximum concentration of emanation is limited, the so-called "equilibrium" denoting the maximum amount of emanation which can be present in the known amount of radium salt or radium solution. This condition corresponding to the maximum amount of emanation is an actual state of equilibrium, i. e., the same quantity of emanation is decaying per second as is being formed from the radium in the same time.

During the past ten years more and more hospitals have adopted the use of capillary glass tubes filled with concentrated emanation instead of using sealed tubes containing radium salts. This practice has been adopted for a number of reasons; among these is the avoidance of the risk of breakage and loss of the valuable radium preparations when handled in tiny glass tubes, even tho this is done by skilled technical personnel. Also a good many radium tubes in the past have been lost or stolen and accordingly the rates of insurance on radium preparations have grown very high. To avoid these risks it has become more and more the practice in recent years to pump off practically all the emanation produced each day by a given quantity of radium and then to use these quantities of emanation contained in these glass tubes (even smaller than the tubes which contain the corresponding amount of radium) instead of using tubes containing the radium salt itself.

The apparatus used for collecting and concentrating (or purifying) the radium emanation is commonly called an "emanation apparatus". This emanation apparatus depends, so far as the purification or concentration of the emanation is concerned, upon the utilization of the following chemical reactions for removing the gaseous impurities from the emanation.

A. The combination of oxygen and hydrogen (present in large amounts as impurities) by sparking or by exposure to an incandescent filament.

B. Absorption of water vapors by $P_2O_5$ or other water absorbent.

C. The removal of excessive amounts of hydrogen by oxidation with a heated copper oxide coil.

D. The separation of the emanation from the impurities by subjecting the emanation to the action of very low temperatures produced by means of liquid air.

In practice, the application of the various emanation apparatus hitherto in use involves very serious difficulties which have greatly hindered the progress of this art in these directions. Thus, for example, certain of the emanation apparatus, although giving the highest possible concentration of radium emanation, require for their practical operation, a highly skilled well trained technical operator and are so complicated that whenever a break occurs in the apparatus it can be repaired as a rule only by a professional glass blower. Replacement of parts of the glass apparatus thus requires much time and causes expensive delay. To overcome this latter difficulty the use of a duplicate apparatus or so-called "twin apparatus" has sometimes been resorted to, but while this expedient overcomes delays due to breakage, it complicates rather than simplifies the procedure and the equipment as a whole. Moreover, the cost of such a complicated emanation apparatus is objectionably high and the salary of the operator who must be a trained physicist or chemist, adds another item to this expense, thus making it impossible for many to make use of this method of using radium, because the total expense involved is too great.

The emanation apparatus of the present invention is much smaller and less complicated than those hitherto in use, and is sufficiently simple to be conveniently operative by the average radium practitioner. The cost of construction is very low and within the means of the smaller institutions which cannot afford to buy 500 or 1000 milligrams of radium at one time, or which cannot afford to employ an expert trained physicist or chemist to manipulate and care for the apparatus.

This simplification and reduction in size of the emanation apparatus is accomplished in accordance with the present invention by various means, among which are the provision of a special auxiliary trap chamber for bringing about the last stages of the evacuation of certain portions of the apparatus without the use of a special vacuum pump and necessary connections, etc. In this manner and by this means substantially the same results are attained with only one vacuum pump as are ordinarily accomplished by means of two vacuum pumps. This contributes considerably to a reduction in size of the apparatus as a whole, so that it may be conveniently stored in a safe or vault for safe keeping when not in operation.

Another important feature of our invention consists in the removal of the greater portion of the impurities from the emanation by causing the combustible gases and the oxygen contained in the impurities to combine under the influence of an electric spark under moderate pressure and then subsequently subjecting the emanation and the residue of the impurities to the action of a solid metallic oxide oxidizing agent such as cupric oxide. By this procedure the necessity for treating successive portions of the mixture of emanation and impurities in a diluted or expanded state is avoided. Also the time of contact between the emanation and the organic stopcock lubricants is greatly reduced by this procedure so that no objectionable amounts of decomposition products are formed from the action of the emanation on the organic constituents of the lubricant. This enables one to obtain highly concentrated emanation with the ordinary type of stopcock and lubricant and without resorting to special non-oxidizable lubricants for the stopcocks.

Another important feature of the invention is the absorption of combustion products (resulting from the combination of the combustible impurities with the oxygen) upon the surface of a solid absorbent, preferably under moderate pressure, whereby the volume of the gases is greatly reduced prior to the removal of the final residual impurities. In the concentrated condition thus obtained these residual impurities may then be completely removed by mere contact in a small capillary tube with a very small particle or mass of heated copper oxide or equivalent solid oxidizing agent.

It will thus be noted that thruout the process of purifying and concentrating the emanation, the total volume of gases is kept at a minimum, thus contributing to the compactness of the apparatus as well as to the rapidity with which the entire process of concentrating and purifying may be carried out. In this connection, the sequence in which the various purification steps are carried out is of importance and constitutes one of the important features of our invention. Thus it will be noted that oxidation of the combustible impurities is carried out (after drying) first by an explosion step under moderately increased pressure and then by contact with a solid oxidizing agent.

Other important features and advantages of our invention will appear from the description of one form of apparatus, which we have found to be suitable in practice. The drawing shows diagrammatically our improved apparatus mounted on a suitable support.

In the drawing, the collecting chamber or container 12 for holding the radium solution is provided with a filling tube 13 adapted to be hermetically sealed off, and is connected through the tube 14 and stopcock 1 to the expansion chamber 15. A branch tube 16 provided with stopcock 2 connects the tube 14 with the trap 17, which in turn is connected thru the tube 18 provided with stopcock 55 with a vacuum pump not shown in the drawing.

The explosion chamber 19 provided with the electrodes 20 is connected on the one side with the expansion chamber 15 thru the tube 21 and the stopcock 9 and on the other side with the auxiliary trap chamber 22 and also with the detachable tube 23 thru the tube 24 provided with the stopcock 10 and the branch tube 25 provided with stopcock, 11. The expansion chamber, 15, is connected on its lower side thru the tube, 26, and the branch tube, 27, provided with the stopcock, 8, with the detachable absorption bulbs 28 and 29. The mercury chamber, 30, is connected on its upper side thru the tube, 31, and the stopcock, 5, with the air and also thru the branch tube, 32, provided with the stopcock, 4, with the trap, 17, and the vacuum pump not shown in the drawing. On its lower side the mercury chamber, 30, is connected thru the tube, 33, and the stopcock, 6, and the tube, 26, with the expansion chamber, 15, and also with the branch tube, 27, and with the tube 14. The mercury leveling bulb, 34, is connected thru the flexible rubber tube 35, and the stop cock 7 with the tube 33.

In the preferred embodiment of my invention the entire apparatus, exclusive of the vacuum pump, is sufficiently small to be mounted on a wooden board 40 about 70 centimeters high and 36 centimeters wide, and the whole apparatus can be kept, together with the radium solution, in a safe-cabinet or vault of very small dimensions.

The apparatus illustrated in the drawing is made in five parts which may be conveniently detached from each other and reassembled in a very short period of time by means of the ground glass joints 36, 37, 38 and 39. The apparatus is constructed in such a way that each of these ground joints can be replaced by an exactly fitting spare joint, and, therefore, whenever a break occurs it is very easy to insert the new part in half an hour or so and to have no interruption in the daily operation of the apparatus. The collecting chamber or container 12 for the radium solution is detachable from the remainder of the apparatus by means of the ground glass joint, 36, and the positive portion of this joint is ground in such manner as to fit the negative portion of the corresponding joint on a second apparatus so that it is possible to use the same container for the radium solution in connection with more than one apparatus. Likewise it is also possible to use several different collecting chambers or containers for the radium solution in connection with the same apparatus.

All the ground glass joints are provided with mercury cups 50 by means of which they may be sealed with mercury.

Because of the fact that the apparatus in its preferred form is constructed in sections or parts it may be cleaned very readily. This is a great advantage as it is well known that all glass apparatus coming in contact with emanation and with mercury is gradually covered with a layer of mercury deposits, which is thought to be mercurous chloride or bromide. The internal cleaning of emanation apparatus of the type hitherto known is effected only by cutting the glass connections and resealing after cleaning, which operation besides being laborious, also sometimes causes other serious difficulties in practice.

The main portions of the apparatus are constructed preferably of soft glass. The inside parts of the various stopcocks are constructed preferably of pyrex glass. Stopcocks constructed in this manner do not stick, especially when very little grease is used for lubrication.

The vacuum pump (not shown in the drawing) is connected as previously stated, with the remainder of the apparatus thru the tube 18 and mercury trap 17. The vacuum pump which we prefer to use in connection with our improved emanation apparatus is the rotary type such as the "Hyvac" pump capable of giving a vacuum on such an apparatus of somewhat less than 1/1000 of a millimeter. By means of the special auxiliary trap chamber in connection with the mercury manipulating device illustrated in the drawing, it is possible by means of our invention to obtain about one hundred-fold better vacuum than this without using an additional vacuum pump in accordance with the usual practice hitherto.

As previously mentioned, the construction of our improved apparatus enables the process of collecting and concentrating the radium emanation to be carried out in such manner that the emanation is in contact but a very short time (less than ten minutes) with most of the grease stopcocks or mercury sealed ground glass joints, and for this reason the amount of organic vapors liberated by the action of the emanation upon organic material is practically negligible.

Since the stopcock 1 is on one side in permanent contact with the emanation it is desirable about every second week to remove this stopcock and clean it and lubricate it with fresh grease. The remaining cocks do not have to be cleaned and regreased, ordinarily, any oftener than about once a month, even when the apparatus is in daily use.

Convenient dimensions for the principal parts of our apparatus in its preferred form are as follows:

A collecting chamber or container for the radium solution (12 in the drawing) of about 30 cc.; an expansion chamber (15 in the drawing) of about 360 cc.; a mercury chamber or container (30 in the drawing) of about 500 cc.; an explosion chamber (19 in the drawing) of about 2½ cc. diameter, and provided with electrodes of platinum wire forming a spark gap of about 6 mm. length.

In assembling and operating our improved apparatus all the various parts of the apparatus are first cleaned and the stopcocks and joints greased by good vacuum grease. The various parts are then assembled and the apparatus mounted upon the support, 40, by means of suitable brass clamps and screws. All clamps are padded with heavy felt. The container for the radium solution is not attached until the remainder of the apparatus has been thus cleaned and mounted on the frame. All mercury cups around the joints are filled with mercury and the absorption bulbs, 41, and 29 are filled with fresh phosphorus pentoxide or equivalent drying agent, and the absorption bulb, 28, is filled with powdered dry potassium hydroxide or equivalent absorbent for carbon dioxide and attached to the apparatus by means of the ground glass joint 42, 43, and 44, respectively. The main portion of the apparatus is next evacuated by means of the rotary vacuum pump. During this operation stopcocks, 1, 5, and 7 remain closed and the remaining stopcocks, 2, 4, 8, 9, 10, 11, and 6 remain open.

The mercury leveling bulb, 34, is now removed and the rubber hose, 44, is dipped into a jar containing from twelve to fourteen pounds of freshly distilled mercury. Stopcock, 7, is then opened and the mercury automatically allowed to rise thru the ground glass mercury sealed joint 39, and also into the mercury chamber, 35, until the latter is almost filled. Stopcock, 7, is now closed. The rubber hose, 44, is attached to the bulb, 34, which then is also filled to about one half of its capacity with mercury.

The apparatus is now in condition for receiving the impure radium emanation which has been previously collected in the container for the radium solution (12, in the drawing). It should be noted, however, that when the apparatus is first put into operation it requires a somewhat longer time to obtain the required vacuum because of the fact that the apparatus has not been previously dried out. A suitable test as to whether the main portions of the apparatus are in suitable condition for the reception of the impure emanation is to allow it to stand after being evacuated as described above for about a day, and then test the vacuum inside the apparatus by observing the character of the discharge in the explosion chamber 19. If the discharge shows a green fluorescence of the glass walls ("Röntgen" vacuum) the apparatus is in suitable condition for receiving the impure emanation.

Before the final evacuation by means of the auxiliary trap chamber 22 and the mercury-manipulating device comprising the parts 34 and 35 and their connections, one or two small pieces of copper oxide 46 in the form of a wire about ½ cm. long are introduced into the tube 23 and shaken down into the capillary tube 45 which is slightly bent to better retain this solid material. Also, if desired, a small piece of dry potassium hydroxide or equivalent absorbent may be placed in the end capillary tube along with the copper oxide.

When the vacuum has been found to be satisfactory by the test described above, it is always a good indication that the apparatus is tight. Whenever the proper vacuum is not obtained slight leakage can safely be assumed to be the cause. It is very easy to make everything tight again by regreasing and turning the stopcocks and joints. After attaching the receptacle 12 containing the radium solution the first step in the subsequent operations is to remove the air from the radium solution. To accomplish this, after a good vacuum has been reached, close the stopcock 8, 9, 6, and 7 and open the stopcocks, 55, 2, and finally (very cautiously) the stopcock, 1. Almost immediately the solution in the collecting chamber, 12, begins to boil and it is necessary to control this boiling by closing stopcock, 1, partly as soon as bubbles begin to spurt up too fast. Thirty seconds boiling in this manner ordinarily will remove practically every trace of air from the radium solution and from the receptacle, 12. The stopcock 1, is closed completely and the evacuation continued by operating the rotary vacuum pump. After about five minutes stopcocks, 8, 9, and 10 may be opened again and as soon as a good "Röntgen" vacuum is obtained as indicated by green fluorescence when a spark is passed, the apparatus is ready for collecting the first portions of the radium emanation.

Emanation is allowed to accumulate in the receptacle, 12, for a known period (for instance, about twenty-four hours). During this time about 16½% of the equilibrium amount of emanation is formed and while the emanation is collecting the stopcocks, 1, 2, 4, 5, and 6 remain closed and stopcocks, 8, 9, 10, and 11 are kept open to insure proper drying.

The vacuum is now tested again by causing a spark to pass across the electrodes, 20, for a moment. If the vacuum is satisfactory as shown by green fluorescence the process of collecting and concentrating the emanation is carried out in the following manner: Open stopcock, 5, and close the stopcock 8. Then cautiously turn stopcock, 6, until the atmospheric pressure in the mercury chamber, 35, begins to drive up the mercury thru the expansion chamber, 15, and into the explosion chamber 19. As soon as the mercury has reached the branch tube immediately below stopcock, 11, close first the stopcock, 6, and then the stopcock 11. Most of the air residues which were in the expansion chamber 15, and the explosion chamber, 19, and connecting tubes are now caught in the auxiliary trap chamber 22. Now close stopcock, 5, and open, 4, and start the rotary vacuum pump. By opening stopcock, 6, all mercury is withdrawn from the explosion chamber, 19, and the expansion chamber, 15, and their connecting tubes until the mercury level is just above the joint 39. Close stopcocks 6 and 4 again. Now test the vacuum in the expansion chamber 15, the explosion chamber, 19, and the tubes, 23, and 45 by connecting the electrodes, 20, with a suitable induction coil and switching on the current. If no visible discharge passes thru the explosion chamber the vacuum is satisfactory and is about 0.00001 mm. of mercury.

Now close stopcock, 10, and turn 1 very slowly until the solution in the collecting chamber, 12, begins to boil. Keep it boiling for 30 to 50 seconds and close 1. Most of the emanation is now in the expansion chamber, 15, and the explosion chamber 19. Push it up into the explosion chamber by admitting air into mercury container, 30, through stopcock, 5, and opening stopcock, 6, slowly until the mercury has filled expansion chamber 15 and touches the lower part of the stopcock 9. At this moment close stopcocks, 9 and 5 and draw the mercury back by connection with the pump through stopcock 4, until the normal level above joint, 39, is reached.

Close stopcock 6 and open 1 in order to boil the solution a second time. Thirty seconds boiling is sufficient to drive out the last residues of emanation with all foreign gases. Close 1 and open 5 and turn 6 slowly until the mercury again begins to rise in expansion chamber 15. Before it reaches stopcock 9 open this stopcock and push the mercury further up until explosion chamber 19 is filled to its lower third. Then close stopcock 6 (stopcocks 5 and 9 remain open).

The collected gases mixed with emanation contain much hydrogen and oxygen. A spark between the electrodes 20 in the explosion chamber 19 causes a bright flash and combination of oxygen and hydrogen to water which is largely deposited on the glass walls of the explosion chamber 19. Now open stopcock 10 (11 remains closed) and by slowly turning 6 the mercury rises above stopcock 10 leaving the water behind in the explosion chamber 19. As soon as the mercury reaches the joint 37 its further movement is stopped by shutting off stopcock 6. Now we have emanation mixed with the excess of hydrogen, carbon dioxide, water vapor, traces of organic vapors and helium. Hydrogen and other oxidizable impurities are removed by heating the tiny copper oxide wires in 45 from outside by a very small gas flame (using a fine pointed capillary tube connected to the gas cock). Heating for one or two minutes is sufficient to oxidize these gases. The water vapor formed and carbon dioxide are absorbed in the copper oxide if this is the only reagent present in the tubes 23 and 45 and also in the granules of potassium hydroxide if the latter absorbent is also present.

Now open stopcock 6 again and immediately the mercury climbs up towards the capillary tube 45. In order to have the emanation tube free from copper oxide we simply heat the end of tube 46 and the wire is sealed off by the collapsing capillary tube. This end is drawn off by a heated glass rod, a constriction being first formed in the capillary tube 23 by means of the little flame and then the residual gases with the emanation sealed off. It requires very little skill to do this work and losses of emanation are impossible since even excessive heating would only push back the mercury from the end of the tube 46 towards the joint 37.

The residual gases, when working with 100 mg. radium in solution every day, give a volume of 0.03–0.05 cubic cm. with about 15 millicuries of emanation at $\frac{1}{5}$ of the atmospheric pressure. For many medical purposes this concentration is sufficient.

Further reduction of the size of the tube can be obtained by the use of the levelling bulb 34. Close stop cock 6, open stopcock 7 and by lifting levelling bulb 34 we can immediately reduce the volume of the gases to $\frac{1}{3}$ or $\frac{1}{4}$. It is not advisable, however, to lift levelling bulb too high, because in sealing off the end tube the pressure inside is naturally increased and a perforation of the thin walled tube is possible. When no caustic agent in the tubes 23 or 45 is used, the volume of the residual gases after oxidation with copper oxide is about $2mm.^3$ at $\frac{1}{2}$ atmospheric pressure per 1 millicurie. Even this concentration is sufficiently high for almost every medical application of emanation tubes.

It is convenient to provide thirty end tubes (with capillary end) fitting to the same joint 37 so that the apparatus can be operated about one year before any replacement of capillary tubes is necessary. It is very easy to have new capillary end tubes 45 drawn out from the bent glass tubes 23. In fact every glass blower can do it. Thus the same thirty joints can be used for a good many years.

In case the purification process as described above is not sufficient for special experimental work (for instance spectral analysis) the liquid air method can be applied in addition to the method described using the same apparatus. In this case the capillary end 45 of the tube 23 is bent vertically downward and immersed in a small Dewar beaker containing liquid air. The mercury in the end tube 23 is drawn back toward the joint 37 and a vertical branch tube (not shown in the drawing) joining 23 just above the first bend therein and provided with a stopcock permit one to pump off all residual gases while the emanation in the end capillary tube 45 is in liquid state. Then the stopcock in the branch tube is closed, the liquid air removed and the mercury pushed up into the capillary tube. This method gives the highest purification.

For many medical purposes the use of this final purification will be found necessary.

As soon as the end capillary tube, containing the emanation is sealed off the apparatus can be made ready for the experiment of the next day in a very simple way. The mercury is drawn back from the capillary tube 45 and end tube 23 and into expansion chamber 15 by closing stopcock 5 and opening stopcock 4 and until it stands a little higher than the joint 39. Then close stopcock 4, 10 and 11 and take off the end tube at joint 37. Clean it out by cotton wound around an iron wire, insert a new piece of copper oxide wire, bend the end capillary at the desired point and insert a new granule of potassium hydroxide, if desired. Then grease the joint 37 and set it up. Finally open stopcock 10 and 2 and evacuate the whole apparatus until "Röntgen" vacuum is reached. After closing stopcock 2 and turning off the rotary pump the apparatus is now ready for the next experiment.

In order to have a homogeneous radiation throughout the malignant growth some physicians use a number of very small capillary tubes (outside diameter 0.5 mm. inside diameter 0.3 mm.; total length 5 mm.) containing about 0.5 millicurie each which are inserted into the malignant tissue by means of a trochar needle.

Capillary end tubes of these dimensions can easily be provided and sealed to the end of our end tubes. The daily output of a convenient amount of radium solution of convenient strength (for instance 15 millicuries) will fill a rather long piece of this fine capillary tube (15 cm.) and in order to obtain the short seeds it is necessary to subdivide this tube by a small flame. An automatic cutting-flame device of a type well known to those skilled in the art can be used for this purpose with good success.

The whole apparatus while being very much simpler in operation and several times cheaper than any of the apparatus used in hospitals for the purpose of filling small glass tubes with emanation, nevertheless, gives the desired concentration. The purification itself does not take more than 15 minutes of each day.

The amount of emanation actually obtained in the small capillary tubes is on an average 93% of the total amount accumulated in the solution.

We claim:—

1. In the method of separating gaseous impurities from radium emanation, the steps which comprise removing a portion of the gaseous impurities from the emanation and subsequently subjecting the emanation and the residue of the gaseous impurities to the action of a solid oxidizing agent, whereby to remove the gaseous impurities and obtain the emanation in a state of substantial purity.

2. The method of separating gaseous impurities from radium emanation which comprises, removing a portion of the gases from the emanation, passing the partially purified emanation to a tube containing an absorbent to obtain the emanation in a state of substantial purity, and sealing off the portion of the tube containing the absorbent, whereby the remaining portion of the tube contains only substantially pure emanation.

3. In the method of separating gaseous impurities containing combustible gases and oxygen from radium emanation, the steps which comprise subjecting the emanation and gaseous impurities to the action of an electric discharge to bring about chemical combination of the oxygen with the combustile gas, then absorbing part of the combustion products produced upon a suitable solid absorbent, and then subjecting the emanation and residual gaseous impurities to the action of the hot cupric oxide.

4. In the method of separating gaseous impurities containing combustible gases and oxygen from radium emanation, the steps which comprise subjecting the emanation and gaseous impurities to the action of an electric discharge to bring about chemical combination of the oxygen with the combustible gas, then absorbing part of the combustion products produced upon a suitable solid absorbent, and then subjecting the emanation and residual gaseous impurities to the action of the hot cupric oxide, the volume of which is considerably less than the volume of emanation and gaseous impurities.

5. The method of obtaining concentrated radium emanation from radium-containing material, which comprises confining the material in a closed receptacle until a convenient amount of gaseous products, including emanation and gaseous impurities containing a combustible gas and oxygen, is formed, then transferring the emanation and the gaseous impurities to a highly evacuated receptacle then compressing the gaseous products, and then subjecting said gaseous products to the action of an electric discharge to bring about the chemical combination of the combustible gas with the oxygen, absorbing the greater portion of the combustion products thus formed by means of a suitable solid absorbent and subsequently subjecting the emanation and the residual gases to the action of a relatively small mass of hot cupric oxide.

6. The method of obtaining concentrated radium emanation from radium-containing material, which comprises confining the material in a closed receptacle until a convenient amount of gaseous products, including emanation and gaseous impurities containing a combustible gas and oxygen, is formed, then transferring the emanation and the gaseous impurities to a highly evacuated receptacle, drying the gases, then compressing the gaseous products and then subjecting said gaseous products to the action of an electric discharge to bring about the chemical combination of the combustible gas with the oxygen, absorbing the greater portion of the combustion products thus formed by means of a suitable solid absorbent, and subsequently subjecting the emanation and the residual gases to the action of a relatively small mass of hot cupric oxide.

7. The method of obtaining concentrated radium emanation from a solution of a radium-containing material, which comprises removing air from the solution, then confining the material in a closed receptacle until a convenient amount of gaseous products, including emanation and gaseous impurities containing a combustible gas and oxygen, is formed, then transferring the emanation and the gaseous impurities to a highly evacuated receptacle, drying the gases, then compressing the gaseous products, and then subjecting said gaseous products to the action of an electric discharge to bring about the chemical combination of the combustible gas with the oxygen, absorbing the greater portion of the combustible products, thus formed by means of a suitable solid absorbent, and subsequently subjecting the emanation and the residual gases to the action of a relatively small mass of hot cupric oxide.

8. The method of obtaining concentrated radium emanation from radium-containing material, which comprises confining the material in a closed receptacle until a convenient amount of gaseous products, including emanation and gaseous impurities containing a combustible gas and oxygen, is formed, then transferring the emanation and the gaseous impurities to a highly evacuated receptacle, then compressing the gaseous products, and then subjecting said gaseous products to the action of an electric discharge to bring about the chemical combination of the combustible gas with the oxygen, absorbing the greater portion of the combustion products thus formed upon a glass surface and subsequently subjecting the emanation and the residual gases to the action of a relatively small mass of hot cupric oxide.

9. In a gas collecting apparatus of the character described, an expansion chamber, an auxiliary trap-chamber, means for connecting and disconnecting the expansion chamber with the trap chamber, and means for transferring gas from the expansion chamber to the auxiliary trap chamber.

10. In a gas collecting apparatus of the character described, an expansion chamber, an auxiliary trap-chamber, means for connecting and disconnecting the expansion chamber with the trap chamber, means for forcing mercury into the expansion chamber against a very low gaseous pressure to displace rarefied gas therefrom and to force it into the auxiliary trap chamber.

11. In a gas collecting apparatus of the character described, the combination of an expansion chamber, an auxiliary trap chamber, and means for connecting and disconnecting the expansion chamber with the trap chamber, a vacuum pump and means for connecting and disconnecting said pump with the expansion chamber and with the auxiliary trap chamber, means for forcing mercury into the expansion chamber against a very low gaseous pressure to displace rarefied gas therefrom and force it into the auxiliary trap chamber, and an explosion chamber provided with electrodes adapted to produce an electric discharge therein, and means for connecting and disconnecting the explosion chamber with the expansion chamber, and a capillary tube and means for connecting and disconnecting the capillary tube with the explosion chamber.

12. In a gas collecting apparatus of the character described, the combination of an expansion chamber, an auxiliary trap chamber and means for connecting and disconnecting the expansion chamber with the trap chamber, a vacuum pump and means for connecting and disconnecting said pump with the explosion chamber and with the auxiliary trap chamber, means for forcing mercury into the expansion chamber against a very low gaseous pressure to displace rarefied gas therefrom and force it into the auxiliary trap chamber, and an explosion chamber provided with electrodes adapted to produce an electric discharge therein and means for connecting and disconnecting the explosion chamber with the expansion chamber, a capillary tube and means for connecting and disconnecting the capillary tube with the explosion chamber, and an absorption bulb and means for connecting and disconnecting said absorption bulb with the expansion chamber.

In testimony whereof we affix our signatures.

Dr. VICTOR F. HESS.
EDWIN D. LEMAN.